United States Patent [19]
Caron

[11] 3,786,671
[45] Jan. 22, 1974

[54] VEHICLE VACUUM CHAMBER LEAK TESTING DEVICE

[76] Inventor: Joseph Adalbert Caron, 1170, 9th St., Box 341, Grand Mere, Quebec, Canada

[22] Filed: Feb. 3, 1972

[21] Appl. No.: 223,066

[52] U.S. Cl. ......................... 73/40, 73/49.7, 116/70
[51] Int. Cl. ............................................. G01m 3/02
[58] Field of Search ...... 73/40, 46, 47, 49.7; 116/70

[56] References Cited
UNITED STATES PATENTS
2,748,598   6/1956   Sterns ..................................... 73/40
3,595,200   7/1971   Cilento ................................. 116/70

*Primary Examiner*—Richard C. Queisser
*Assistant Examiner*—Joseph W. Roskos

[57] ABSTRACT

A mannually operated vacuum device, particularly adapted to use the engine running vacuum to detect the leaks in a vacuum chamber of ignition distributors, automatic transmission, heater controls antipolution devices, etc.; without removal thereof from the vehicle. The device includes an operation mechanism and a leak indication mechanism connected by a main passage arranged to connect the engine intake manifold to the vacuum chamber to be checked. The operating mechanism includes a valve along said main passage and a button to selectively open and close the valve. The leak indication mechanism includes diaphragm, and indicator fixed to the latter, and a return spring whereby a leak will be indicated by the displacement of the indicator.

4 Claims, 3 Drawing Figures

PATENTED JAN 22 1974        3,786,671

VEHICLE VACUUM CHAMBER LEAK TESTING DEVICE

The present invention refers to a new device permitting the testing of the tightness of vacuum chambers on vehicles with engine vacuum; these vacuum chambers are used on ignition distributors, automatic transmissions, heater controls, also on most antipollution devices on automobiles.

It is current practice for mechanics to proceed by substitution or to create vacuum with their mouth to detect a leak in the vacuum chamber of these various mechanisms. Also, test-benches for ignition distributors are equipped with a vacuum pump permitting the checking for tightness, when the distributor is installed on tester. However, most garagists have no distributor test-bench, due to the high cost.

The vacuum chamber is more and more frequently used in operation of various mechanisms on late vehicle models such as antipolution systems. The above-mentioned actual checking methods are not in accordance with the effective standards required, and have many inconveniences. It is obvious that the first method constitutes a notable loss of time in trial and error by substitution, and that with the second method it is not possible to determine with certainty the real condition of the vacuum chamber. The third method, when it is possible to use it, necessitates the unit removal from the vehicle, what unnecessarily extends the duration of the test. Also, proper operation of vacuum pumps used on distributor test-benches is highly affected by this kind of test; due to harmfull particles which penetrate into the pump and contribute to a premature pump failure.

I have discovered that these inconveniences would be eliminated by an easy method, which permits rapid checking for tightness of all vacuum chambers used on vehicles, using a new device specially made for this purpose. It is now possible at low cost for all garagists, to use the engine vacuum to detect a leak in a vacuum chamber or connecting hoses thereof with certainty and in short order.

The device includes a housing which there are two connecting sleeves or nipples equipped with hoses; at one end of the housing a hose permits the connection to the vacuum intake manifold, and at the other end of the housing the other hose allows connection to the main tube of the vacuum chamber of a unit to be checked. An operating valve located in the housing permits a simple thumb action to open and hermetically close a main passage joining the two connecting sleeves. A leak indicator fixed to a diaphragm is located in the housing and plunges into it on vacuum effect. A spring engaging the diaphragm, pushes out the indicator, when the vacuum is replaced by air coming in through a leak, thereby revealing the leak.

When the device is installed and the engine is running, it suffices to press down the operating button, with a light pressure, for a few seconds, to obtain a vacuum inside the vacuum chamber. The release of the operating button permits the automatic sealed closing of the main passage, and thus shorts off both connecting sleeves. The lower or inward position of the indicator is a no leak indication and vacuum will subsist. In the opposite case, the outward position of the indicator, each vacuum chamber should be checked separately, so as to determine the faulty chamber where the leak is. In such a way the test can be made in only a few minutes.

In referring to the illustrating drawings representing a preferred embodiment of the testing device:

Figure 3:
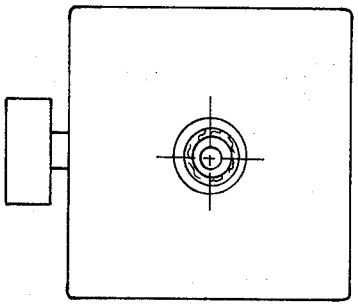
FIG. 3 is a right end view of the testing device shown in FIGS. 1 and 2.
Figure 2:
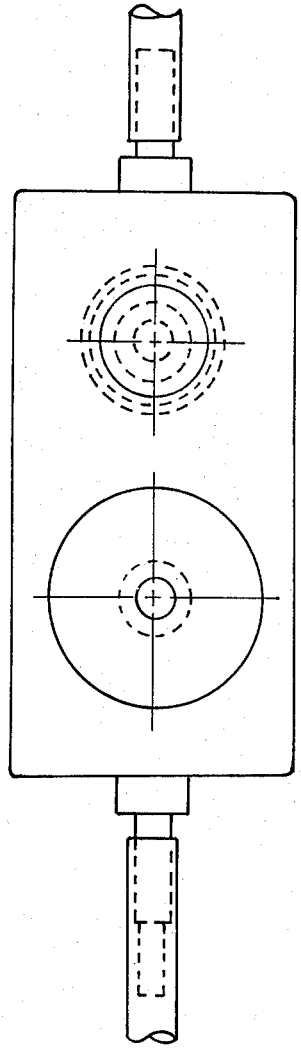
FIG. 2 is a top view of a testing device according to the invention.
Figure 1:
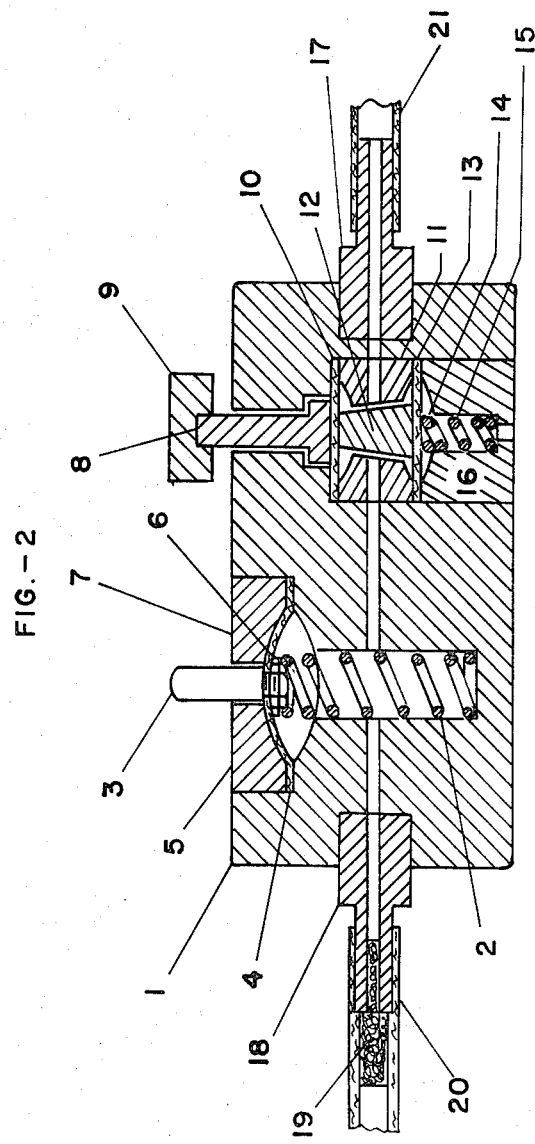
FIG. 1 is a cross-sectional view of a testing device according to the invention as seen along the line 1—1 in FIG. 2.

The references are numbered from 1 to 21, in the assembling order.

The illustrated testing device is made of nylon, and most component parts are fashioned with precision on a lathe and fixed under pressure with some thousandths of an inch of tension. Housing 1 is a rectangular nylon block with square ends, and with slightly rounded off exterior angles. A one-eighth of an inch diameter hole is drilled through lengthwise in housing 1, to constitute the main passage. Other holes of different dimensions are so drilled in housing 1, to receive the component parts. Also, it may be made from a moulded part, or in two parts by the injection process to eliminate some external parts and time, and to obtain the same results with the least cost in production.

The return spring 2, is located in a hole under diaphragm 4 and the leak indicator 3 and keeps them in upper return position against retainer 7, with appropriate force when the vacuum is replaced by air. The leak indicator 3 is mounted on diaphragm 4, by washer 5 and nut 6. The diaphragm 4 is held hermetically sealed in place by retainer 7, which is fixed under pressure. The retainer 7 will not be used in the injection process production. The leak indicator 3 may move freely in the hole at the center of retainer 7, with an approximative clearance of 0.001 inch. Thus in this manner spring 2, leak indicator 3, diaphragm 4, washer 5, nut 6 and retainer 7, constitute the whole mechanism for the leak indication in the housing.

Diaphragm 4 is made from a very flexible thin material disc in such a way to permit its movement in the oval space, as indicated.

The operating rod 8 is located in a hole of housing 1 in which it can move freely with an approximative clearance of 0.002 of an inch. Its upper stroke is determined by a lower part enlargement of operating rod 8, in housing 1 support well. It permits the opening of operating valve 12, when the operator presses down on operating button 9, which is fixed under pressure on the operating rod 8, so that the operation will be easier. The flexible seal disc 10, assures the tightness of the upper part of the valve seat 11 and operating valve 12. It constitutes the contact point for the rod 8 with valve 12.

The valve seat 11, is a round part fixed under pressure in housing 1; to tightly fix the flexible seal disc 10. Its upper surface is slightly concave; permitting the free movement of the operating rod 8 and the flexible seal disc 10.

In its center a taper hole is precisely fashioned upright, with the small diameter at the upper end. It constitutes the so called seat of the operating valve 12. A ⅛ inch diameter hole is drilled across and in the middle of valve seat 11, as indicated to complete the main passage. The valve seat 11, may be made from resilient material with the use of a hard material operating valve 12, or vice versa, but the first process is better.

The operating valve 12 is precisely fashioned taper so that its contour fits hermetically to seat 11. It permits the closing and opening of the main passage, as required by the operator. Valve 12 is of the floating type, so as to obtain an effective adjustment on seat 11, without constraint on the other parts of the mechanism; to assure the hermetic closing of the main passage; essential condition for the proper operation of the device.

The flexible seal disc 13, assures the tightness of the lower end of the valve seat 11 and operating valve 12. It constitutes the contact-point of valve 12 with the spring seat 14 and spring 15. So that they can accomplish an effective action; the flexible seal discs 10 and 13 are made of very flexible and resistant thin material discs, which cover the entire surface. The spring seat 14 mounted on spring 15, assures the protection of seal disc 13, against the rough angles of spring 15. Spring 15 is of appropriate pressure and assures the complete closing of valve 12, when the operating button 9 is released by the operator.

Retainer 16 is a cylindrical part fixed under pressure in housing 1, so as to fix tightly the flexible seal disc 13. Its upper surface is slightly concave, permitting the free movement of operating valve 12 and of flexible seal disc 13. In its center, a 5/16 inch diameter hole is drilled upright from the upper surface to within ⅛ inch of the lower surface, to receive the return spring 15. From this point, a ⅛ inch diameter hole is drilled through to the lower surface, as indicated. This hole constitutes an opening to the atmospheric pressure, so movements of the operation mechanism will be free. An air vent eliminates a detrimental pressure possibility, which may constrict the closing of the valve 12. In this way, button 9, rod 8, seal discs 10 and 13, valve seat 11, valve 12, spring seat 14, return srping 15 and the retainer 16, constitute the whole of the operating mechanism. In the injection process production; retainer 16 will be an integral part of housing 1. Connecting sleeve 17, is fixed under pressure in housing I, and permits by transition through hose 21 the connecting of the testing device to the engine intake manifold. The connecting sleeve or nipple 18, fixed under pressure in housing 1, permits, by way of hose 20, the connection of the testing device to the vacuum chamber to be checked. In the injection process production, the connecting sleeves 17 and 18 will be possible integral parts of housing 1. Rubber hoses 20 and 21, have a ¼ inch diameter and a sufficient length of approximately 2 ½ feet, so that the operator can do the tests easily. Also, two adapters (not shown) permit the connecting of the testing device to any different hose sizes used.

Filter 19 eliminates all harmful particles, which can penetrate into the testing device and affect its proper operation.

Here is briefly the operation of the testing.

When hose 20 is connected on the vacuum chamber to be checked and hose 21 is connected to the intake manifold connector of a running engine; a vacuum is created in the testing device main passage up to the operating valve 12, which is closed to let air into the other section of the main passage. But, when the operator presses down on the operating button 9, rod 8 transmits action to seal disc 10, and to operating valve 12, which lifts slightly from seat 11, to open the main passage, and permits the vacuum to be created in the vacuum chamber (not illustrated); by way of filter 19 and hose 20. On vacuum action the diaphragm 4 plunges with the indicator 3, compressing the return spring 2. Operating button 9 is then released and as this time the main passage is closed again by valve 12, by means of pressure action of return spring 15, which forces the rod 8 and the operating button 9 to move back to the original position. If there is no air leak, the indicator 3 will be in plunged inward position and remain. A leak in the vacuum chamber or its conduit will cause the air to penetrate into the main passage of the testing device, thus replacing the vacuum and so permitting the return spring 2 to push up the diaphragm 4 and indicator 3, to reveal that a leak exists.

Instructions to use this testing device.

Caution.

This testing device operates in only one direction, and consequently, the following indications must be observed, to properly connect this testing device on the car.

Connect hose 21 to the engine intake manifold connector, and hose 20 to the vacuum chamber to be checked.

Have the engine running at idle.

Press on the operating button 9, until the indicator 3 is totally plunged, and release button 9.

If the indicator 3 plunges down nearest to the surface of housing 1 and remains after the button 9 is released; this represents an indication of a no leak condition.

If indicator 3 plunges down partially; or that is, goes up after the button 9 is released, this represents a leak indication.

When a leak is found, the same procedure must be repeated to check each vacuum chamber separately, so as to localize the one which is faulty, and at the same time eliminate the possibility of faulty hose connections. It is now easy to find the faulty unit, and replace it.

Here is some useful recommendations, relative to the use of this testing device.

The tightness of this device can be easily checked by a lack of a vacuum at the end of hose 20, when the operating button is released, and hose 21 is connected to a running engine. Also, the same result can be obtained by the obturation of hose 20 and by pressing down on operating button 9 and releasing the same, and in temporarily disconnecting temporarily hose 21 or momentarily stopping the engine. If at this time, the indicator 3 remains in the downward position; the tightness of the testing device is ensured.

It should be advised to do some preliminary tests, before checking a vacuum chamber, so that the possibility of a faulty testing device will be eliminated and to keep a proper interpretation of the test. This is the only precautionary measure, so that the leak possibilities in the testing device are relatively low.

When we find a leak in the operating mechanism, and we think it is a foreign particle lodged between the operating valve 12 and its seat 11, it is recommended to do a cleanup of the testing device, by proceeding in the following manner: It suffices to completely press down operating button 9 a few times, when the connecting sleeve 17 and hose 21 are connected to a running engine intake manifold connector, and that hose 20 and filter 19 are disconnected from connecting sleeve 18. Repeat tightness test on the testing device another time. In the case where it is not possible to remove a harmful particule, this can be done, by using compressed air with great precaution to eliminate the risk of damage to the testing device. Proceed in the following manner: Disconnect totally the testing device from the engine and remove hoses 20 and 21 and filter 19. Totally press down operating button 9 to fully open operating valve 12, and keep it open. Employ a little compressed air at reduced pressure to connecting sleeves 17 and 18. Repeat a few times and also repeat the tightness test for the testing device.

I claim:

1. A leak testing device operated to detect a leak in a vacuum chamber, comprising a housing having a main passage extending therethrough, a first connecting means secured to said housing in fluid communication with one end of said main passage and arranged to be connected to said vacuum chamber, a second connecting means secured to said housing in fluid communication with the other end of said main passage, and arranged to be connected to a source of vacuum, a leak indicating mechanism mounted onto said housing and including a peripherally sealed pressure responsive diaphragm, a first spring and an indicating member operatively associated to said diaphragm, the latter being arranged on one side of said main passage with one face thereof in fluid communication with said main passage, said indicating member being constructed and arranged to respond to the displacement of said diaphragm in response to the change of pressure against said one face thereof, an operating valve mechanism mounted onto said housing intermediate said lead indicating mechanism and said second connecting means, and including a tapering valve member having tapering faces arranged into the path of and intersecting said main passage, a second spring associated to said tapering valve member and biasing the latter towards a closing position sealing said main passage, and a manual operating member operatively connected to said tapering valve member and arranged to displace the latter to an open position against the bias of said second spring, whereby to selectively open said valve to evacuate said vacuum chamber and main passage and to close said valve and then detect a leak into said chamber upon displacement of said indicating member.

2. A leak testing device as defined in claim 1, wherein said operating valve mechanism includes a tapering valve seat extending transversely of said main passage and constructed and arranged to be tightly sealed by said tapering valve member upon transverse displacement thereof relative to said main passage and a pair of flexible seal discs are arranged at opposite ends respectively of said tapering valve seat and of said tapering valve member transversally confining and separating the latter from said second spring and said manual operating member respectively.

3. A leak testing device as defined in claim 2, wherein said first spring engages said one face of said fluid responsive diaphragm and biases the latter outwardly away from said main passage and said indicating member constitutes an indicator rod engaging the opposite face of said diaphragm and visually projecting outwardly of said housing.

4. A leak testing device as defined in claim 3, wherein said housing constitutes a molded block having a rectilinear passage therethrough forming said main passage, and said first and second connecting means constitute hose connecting sleeve members secured to to said molded block.

* * * * *